United States Patent [19]

Helfrich et al.

[11] Patent Number: 5,323,092

[45] Date of Patent: Jun. 21, 1994

[54] DEFLECTION WAVEFORM CORRECTION CIRCUIT

[75] Inventors: Kenneth J. Helfrich; Joseph C. Stephens, both of Fishers; David R. Jackson, Indianapolis, all of Ind.

[73] Assignee: Thomson Consumer Electronics, Inc., Indianapolis, Ind.

[21] Appl. No.: 99,301

[22] Filed: Jul. 29, 1993

[30] Foreign Application Priority Data

Sept. 4, 1992 [UK] United Kingdom ............... 9218735

[51] Int. Cl.⁵ .............................................. H01J 29/56
[52] U.S. Cl. .................................................... 315/371
[58] Field of Search ......................................... 315/371

[56] References Cited

U.S. PATENT DOCUMENTS

| | | |
|---|---|---|
| 2,758,248 | 8/1956 | Garrett et al. |
| 3,944,879 | 3/1976 | Suzuki ............................ 315/370 |
| 4,651,063 | 3/1987 | Reh ................................. 315/371 |
| 4,687,972 | 8/1987 | Haferl ............................. 315/371 |
| 4,965,495 | 10/1990 | Wilber et al. .................... 315/371 |
| 5,043,637 | 8/1991 | Gries et al. ..................... 315/371 |

OTHER PUBLICATIONS

Sony Training Manual for ANU-2 Chassis, Cover, frontis piece and pp. 26, 27, 30 and 31.
Sony Service Manual for ANU-2 Chassis Model KV-27EXR95, pp. 1, 49 & 68, dated 1992.
Sony Service Manual for ANU-1 Chassis, Model KV-32HSR10, pp. 1, 35, 36 & 68 dated 1989.
Thorn 9500 Series Colour Television Service Manual, published by Thorn Consumer Electronics Service Division, dated Dec. 1977, p. 28.
Thorn 9000 Series Colour Television Service Manual, published by Thorn Consumer Electronics Service Division, dated Nov. 1975, p. 19.
Schematic of the Deflection and Power Supply Circuit in the Metz Color 7400 Series Television Receivers, Chassis 684 G-1.
U.S. Application Serial No. 099,376.
U.S. Application Serial No. 099,377.

*Primary Examiner*—Theodore M. Blum
*Attorney, Agent, or Firm*—Joseph S. Tripoli; Joseph J. Laks; Francis A. Davenport

[57] ABSTRACT

A deflection apparatus comprises a deflection amplifier coupled to a deflection waveform modulation circuit such as a diode modulator. A source for generating a modulation signal. The modulation signal comprises an AC component and a DC component, each having levels which define an amplitude ratio. An amplifier alters the amplitude ratio, and the altered amplitude ratio signal is coupled to the deflection waveform modulation circuit for deflection waveform modulation.

13 Claims, 3 Drawing Sheets

DEFLECTION WAVEFORM CORRECTION CIRCUIT

BACKGROUND OF THE INVENTION

This invention relates to the field of cathode ray tube deflection amplitude control, such as East-West waveform correction of deflection signals generated by a bus controlled integrated circuit.

The development of single integrated circuits containing both analog and digital television signal processing has greatly reduced receiver parts count, improved reliability and reduced manufacturing cost. Such integrated circuits frequently employ sync separation circuitry to lock a reference oscillator from which horizontal and vertical rate deflection signals are developed. To facilitate control of the I.C. functions with a minimum of circuit board potentiometers and to minimize the I.C. pin count, the integrated circuit may be controlled via a data bus. An example of a data bus system is the Thomson logic protocol which comprises three control lines, data, clock and enable respectively. The I.C. usually contains registers which store digital values that correspond to setup, alignment or user determined values for specific parameters. The stored digital data is converted to an analog value by a digital to analog converter. This analog value is coupled out of the I.C. to control the specific parameter in external circuitry.

To reduce the I.C. pin count, certain waveforms and control signals may output on common I.C. pins. For example, a horizontal pincushion correction waveform, namely a vertical rate parabola, may be output together with a horizontal width determining DC voltage. Thus a single IC pin is used for two circuit control functions. The selection of horizontal pincushion, and horizontal width control parameters is advantageous since both parameters may be controlled by a common deflection circuit configuration, for example a pulse width modulator coupled to a pincushion diode modulator. Thus the vertical rate parabola may be superimposed on a horizontal width determining DC voltage. However, this composite control signal requires DC coupling to the point of circuit control. Furthermore, control requirements may exist for certain deflection yoke/tube combinations which require control signal amplitudes which tend to exceed the output voltage swing capability of the multifunction I.C. Hence constraints exist within the I.C. which limit the maximum amplitude ratio of the two control signals. Additional constraints exist within the I.C. in terms of the range of digital control, i.e. number of control data bits, and the consequential size requirements for control value memory.

SUMMARY OF THE INVENTION

A deflection apparatus comprises a deflection amplifier coupled to a deflection waveform modulation circuit. A source for generating a modulation signal where the modulation signal comprises an AC component and a DC component, each having levels which define an amplitude ratio. An amplifier alters the amplitude ratio, and the altered amplitude ratio signal is coupled to the deflection waveform modulation circuit for deflection waveform modulation.

DETAILED DESCRIPTION

Figure 1:
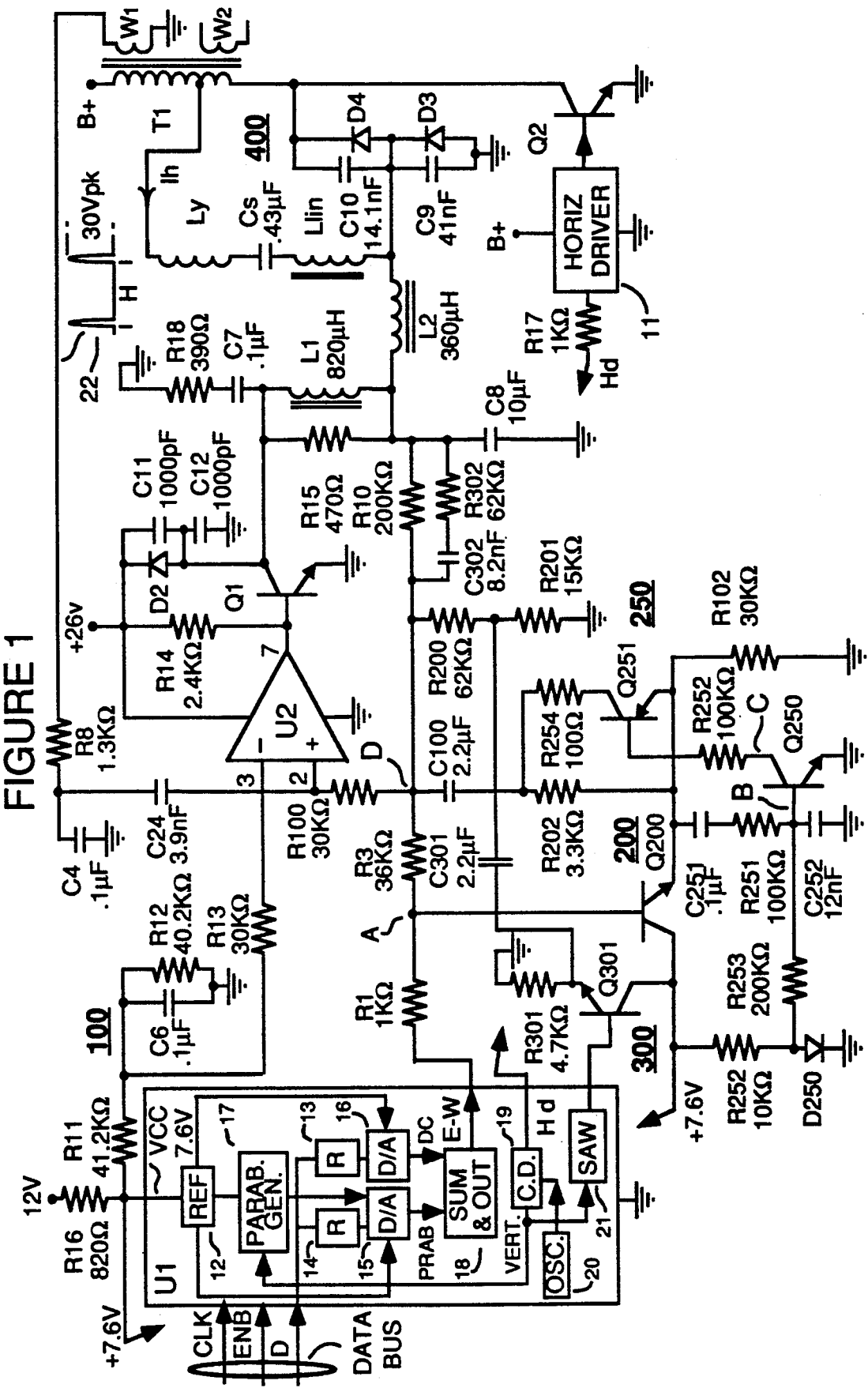
FIG. 1 is a circuit diagram of a horizontal deflection circuit with waveform correction according to various inventive arrangements described herein.

FIG. 1 shows a horizontal deflection circuit based on the use of an integrated circuit U1, which contains a multiplicity of analog and digital television circuit functions. Integrated circuit U1 generates a horizontal rate signal Hd, which is coupled via a driver stage to a horizontal output transistor Q2. Transistor Q2 is coupled to output transformer T1 which has a primary winding tapped to drive a deflection winding Ly. Output transformer T1 has secondary windings W1 and W2. Winding W1 generates a retrace pulse of about 30 volts peak. Winding W2 is coupled to a high voltage ultor power supply generator (not shown). East-West, or pincushion deflection waveform correction is provided by a diode modulator 400. The diode modulator is coupled to the deflection winding Ly and effectively varies the current through the winding in a parabolic manner at vertical rate. Transistor Q1 functions as a saturated switch coupled to the diode modulator and responsive to a horizontal rate, variable width pulse, generated by voltage comparator U2. An input of comparator U2 sums a vertical rate parabola with a DC component from integrated circuit U1, together with an integrated horizontal retrace pulse from transformer T1 winding W1. This composite waveform is compared against a reference potential applied to a second comparator input and results in a comparator output signal having a horizontal rate pulse with a width that varies responsive to the vertical rate parabola.

Integrated circuit U1 is controlled by a microcomputer system (not shown) via three input lines, namely serial data, clock pulse and an enable signal. The serial data employs a Thomson logic protocol. Integrated circuit U1, contains an oscillator OSC 20, operating at 32 times horizontal frequency. This oscillator is phase locked (not shown in FIG. 1), to a horizontal sync signal from a selected video source, i.e. either base band video input or a sync signal demodulated from an RF modulated source. A count down circuit CD 19, produces both horizontal and vertical rate waveforms. A horizontal rate signal Hd, is coupled from IC U1 via a resistor R16, to a horizontal driver stage 11. The horizontal driver is coupled the base of a horizontal output transistor Q2. The emitter of transistor Q2 is grounded and the collector is coupled to a B+ power supply via output transformer T1. Transformer T1 has a primary winding with a tap for driving a horizontal deflection coil Ly. Transformer T1 has a secondary winding W1 which generates a retrace pulse 22 of approximately 30 volts which is coupled via resistor R8, to a summing network at an input of comparator U2. Transformer winding W2 is coupled to an ultor power supply which is not shown. The horizontal deflection coil Ly, is coupled in series with an "S" correction capacitor Cs and a linearity correction inductor Llin.

Pin cushion or East-West deflection correction is produced by diode modulator 400. The diode modulator is formed by diodes D3 and D4 coupled in series with each other and in parallel with series combination of capacitors C9 and C10 respectively. Diode D4 cathode is coupled to the collector of transistor Q2. Diode D4 anode is joined to the cathode of diode D3 and the junction point is coupled to linearity inductor Llin. The junction of diode D3 cathode, and capacitors C9, C10 are coupled via an inductor L2 to the junction of inductor L1 and capacitor C8. Inductor L1 is bridged by a damping resistor R15. Capacitor C8 decouples the horizontal rate pulse current to ground and develops a vertical rate parabolic waveform voltage responsive to the parabolic width modulation of the horizontal pulse.

The collector of transistor Q1 is coupled to a resistor R18 and a capacitor C7 coupled in series to ground. This network, also known as a "snubber", dissipates inductive switching transients produced by inductor L1 at the cessation of current flow in transistor Q1. The time constant of resistor R18 and capacitor C7 is selected to slow the rise of transistor Q1 collector voltage at transistor switch off. Diode D2 anode is connected to the collector of transistor Q1, the cathode being connected to the voltage supply. Thus diode D2 is normally reverse biased by the 26 volt supply. However, when transistor Q1 switches off, the positive voltage transient produced by inductor L1 turns on diode D2, clamping the transient and conducting the inductive current into the 26 volt supply. Thus diode D2 and the "snubber" network formed by capacitor C7, and resistor R18 prevent over dissipation and failure of transistor Q1. Capacitors C11 and C12 bypass high frequencies to prevent the generation of radio frequency harmonics resulting from transistor Q1 switching. Transistor Q1 collector is also coupled via resistor R10 to provide negative feedback to the summing point at the non-inverting input of voltage comparator U2.

The inverting or negative input of voltage comparator U2 is advantageously coupled to a positive reference potential generated potential divider 100. The reference potential coupled to the inverting input of voltage comparator U2 is derived by potential division of a 7.6 volt reference regulator within IC U1. This reference voltage is available at a dropping resistor R16 coupled between the IC and the 12 volt supply. The 7.6 volt reference is coupled to a potential divider formed by a series combination of resistors R11 and R12 with resistor R12 coupled to ground. The junction of the resistors produces approximately 3.75 volts which is decoupled to ground by capacitor C6. The junction of the resistors is also coupled via series resistor R13 to the inverting input of comparator U2.

The positive input of comparator U2 is connected to network 200 which, in conjunction with negative feedback via resistor R10 sums a vertical rate parabolic waveform and DC component, coupled via resistors R2, R3 and capacitor C1, with a horizontal rate ramp. A horizontal ramp is formed across capacitor C4 by integration of the retrace pulse coupled via resistor R8 from winding W1 of transformer T1. Expressed in simple terms, the result of the summation is a horizontal ramp superimposed on the field rate parabola. When the waveform sum applied to the non-inverting input is less than the reference potential applied to the inverting input of comparator U2, the comparator output remains at close to ground potential. Thus the comparator output circuitry sinks current from the 26 volt supply via resistor R14, holding transistor Q1 non-conductive. When the waveform sum exceeds the reference voltage set at the negative input of comparator U2, the output switches from ground, allowing current via resistor R14, to supply the base of transistor Q1 causing it to turn on.

The DC component of the vertical parabola establishes an average value for the parabola and hence sets the average horizontal deflection amplitude or width. The parabola component causes the integrated horizontal flyback pulse to move across the comparator switching threshold following the parabolic waveshape. Hence the comparator output comprises a horizontal rate pulses having widths which vary responsive to the vertical parabola. The parabolic waveform component at transistor Q1 collector is integrated and low pass filtered by inductor L1 and capacitor C8 which provide pincushion correction current to diode modulator 400 via inductor L2.

The collector of transistor Q1 coupled via inductor L1 and horizontal frequency decoupling capacitor C8 to resistor R10 which provides negative feedback to the waveform summing point. Comparator U2 is a switching amplifier operating in the class D mode. At low frequencies, for example, at the parabolic signal frequency, a negative feedback loop is provided by resistor R10 to the non-inverting input of the comparator U2. Comparator U2 may be alternatively configured as a linear class A amplifier to drive a linear diode modulator. An inventive network formed by the series combination of resistor R302 and capacitor C302 is coupled in parallel with resistor R10 provide frequency selective feedback to the summing point D.

Integrated circuit U1 is controlled via a data bus as shown in FIG. 1. The data bus comprises three signals, data D, clock CLK and enable ENB. During receiver setup, adjustments are made to various parameters using a microprocessor controller not shown, and the adjustment value is sent to IC U1 via the data bus as digital data. The digital data is received and stored in a register R. For example, the amplitude value of the East-West parabolic signal is determined by 3 data bits which are stored in register 14. The DC width signal is determined by 4 data bits, which for example, are stored in register 13. A vertical rate parabolic signal is generated by a PARAB GEN. 17 using a signal, VERT., produced by a count down circuit 19. The vertical signal VERT from the count down circuit is also used to generate a sawtooth signal 21. The parabola signal is controlled in amplitude responsive to the value of the control data word stored in register 14. The data word from memory register 14 is applied to a digital to analog converter 15 configured as an R-2R ladder where it controls the parabola amplitude. The parabolic signal is coupled to a summing amplifier 18. Horizontal deflection width is determined by a DC voltage applied to a pulse width modulator U2. This DC voltage is generated within IC U1 by a digital to analog converter 16, configured as an R-2R ladder. The width determining DC is generated by converter 16 responsive to 4 bit control data from register 13, and can have one of 16 possible DC values. Converters 15 and 16 are powered from the 7.6 volt reference regulator 12, within IC U1. This voltage regulator is referenced to an internal band gap voltage reference and is configured to utilize an external dropping resistor R16, coupled to a 12 volt supply. Thus any variations in the 7.6 volt reference regulator 12 will be common to both the amplitude determining D to A converter and correction signal generated thereby. The summing block 18 combines the parabolic signal and the DC width voltage which are then output as the East-West correction signal. Hence, to preserve the DC component of the East-West correction signal, DC coupling is required to the point of horizontal width control, comparator U2.

It is desirable that IC U1 should be usable across a range of TV receiver products with various screen sizes, screen surface geometries and deflection yoke assemblies. To achieve such universality requires a greater range of control for many deflection related parameters. Clearly an IC may be designed to have broader control ranges but this incurs penalties of increased IC die area or size, increased IC power dissipation and increased data storage requirements for setup parameters. Hence by utilizing circuitry external to integrated circuit U1, deflection parameters are provided which are compatible with a range of TV receiver products.

Certain yoke/tube combinations may exhibit vertical trapezoidal distortion of the scanned raster, for example the displayed horizontal line length progressively changes between the top and bottom of the display. Power supply load variations resulting form other deflection circuitry may also introduce a vertically asymmetrical horizontal pincushion distortion. Such vertically varying horizontal deflection distortions are corrected by inventive circuit 300. The network, formed by resistor R302 and capacitor C302, in parallel with feedback resistor R10 produce negative feedback which increases with increasing frequency. The result of such frequency selective feedback produced by resistor R302 and capacitor C302, is to phase shift or delay the parabolic signal component developed by capacitor C8 relative to the parabolic signal at point A. A transistor emitter follower Q301 has a base terminal coupled to a vertical rate sawtooth signal generated by IC U1. The emitter terminal is AC coupled via a capacitor C301 to summing resistors R200 and R201. Thus the sawtooth signal at the emitter of transistor Q301 is potentially divided by resistor R201 and the series combination of resistor R200 and the parallel network formed by resistors R10, R3. The vertical sawtooth is added to the composite signal at point D and may be considered to impart a vertical tilt to the vertical parabolic signal. This tilt results in a progressive lengthening or shortening of the horizontal display line over the duration of the vertical sawtooth.

FIG. 1 shows component values employed in a color TV receiver with a 31 inch cathode ray tube, to center the control ranges for pincushion correction and horizontal width control, and also to provide control range consistent with the control value quantization i.e. the absolute voltage step for each data bit change. The horizontal width determining DC component of the East-West correction signal is controlled in amplitude by 4 data bits, i.e. the voltage may have one of 16 possible values. Within I.C. U1 the 4 data bits are coupled to a digital to analog converter which generates the width determining DC voltage. The digital to analog converter is of the R-2R ladder configuration. The parabolic component is controlled in amplitude by 3 data bits and is combined with the DC component and coupled out of I.C. U1. The maximum correction signal amplitudes are determined by a 7.6 volt regulator within I.C. U1. It is possible to visualize a correction signal condition where maximum values of both the DC component and the parabola are required, however, the combined voltage swing is limited by the supply voltage set by the internal regulator. Certain combinations of deflection components may require that the absolute change in DC voltage, or waveform amplitude corresponding to a single control data bit be changed to increase or decrease the operational sensitivity of the control function. For example the DC component, which is controlled by 4 data bits, may exhibit granularity such that the DC voltage (horizontal width) required for setup can not be achieved since a single data bit change steps the DC beyond the desired setup value. The DC component and vertical parabola waveform resulting from set up are combined and have a certain amplitude ratio one to the other. The combined signal is then coupled out of I.C. U1. To achieve the desired utilization of integrated circuit U1 across a range of TV products an inventive active AC/DC attenuator 200 is employed which produces differing attenuations of the AC and DC component of the East-West correction signal.

The East-West signal is directly coupled to summing point D via a DC potential divider formed by series resistors R1, R3 and the parallel combination of summing point resistors R200, R201 and R10. This potential divider attenuates the DC component of the signal by approximately 40%. The AC component, fed via the directly coupled path, is more severely attenuated as a consequence of the series connected AC coupled path to the emitter of transistor Q200. The emitter impedance of transistor Q200, in series with resistor R202 and capacitor C100, effectively bypass the AC component coupled via DC potential divider.

The East-West signal is also coupled to the base electrode of emitter follower transistor Q200. Emitter follower Q200 has the collector electrode connected to the +7.6 volt reference supply and the emitter connected to ground via resistor R102. The emitter terminal of emitter follower Q200 is AC coupled to the summing point via a series combination of resistor R202 and capacitor C100. The output impedance of emitter follower Q200 and resistor R202 form an attenuator with the summing point resistors. This attenuator attenuates the AC coupled East-West parabolic waveform by approximately 5%.

The amplitude ratio of the parabolic and DC components may also be altered by amplification. An amplifier may be included in the path of either or both components to provide the desired change in amplitude ratio.

The variously attenuated components are combined at the summing point and result in a DC component of 60% amplitude and a parabolic component of 95% amplitude. Thus, inventive active circuit 200 introduces a difference in amplitude between the components of the original East-West signal. Expressed in ratiometric terms, assuming for example that the signal components of the original East-West had a ratio of 1:1, active circuit 200 modifies the ratio to 1.58:1. Thus, the DC component control step size is approximately halved, effectively reducing the granularity of the 4 bit control signal. However the parabolic component control step size is virtually unchanged and is essentially as determined by D to A 15 within I.C. U1.

Figure 2:
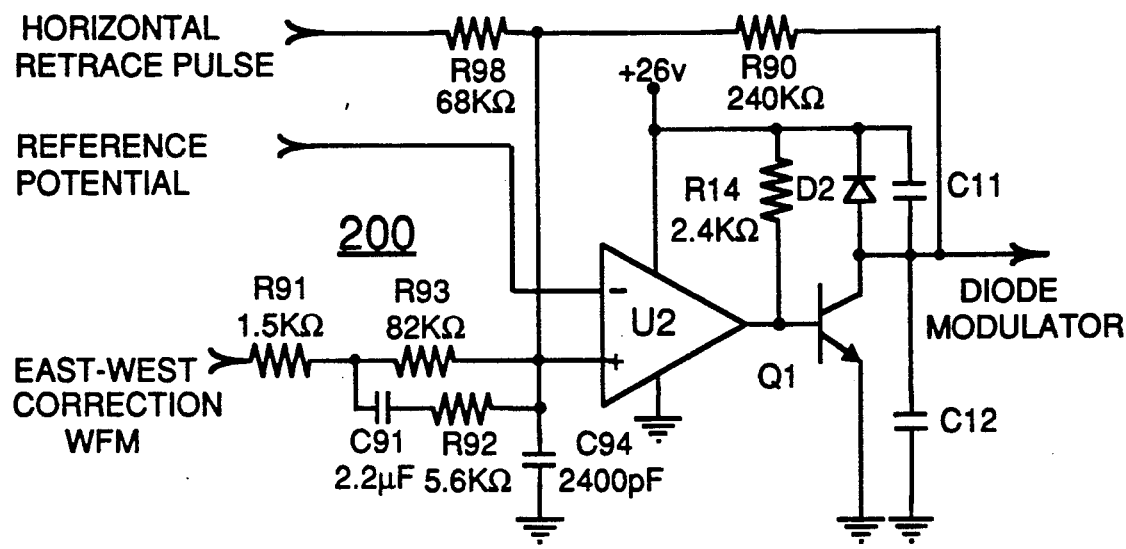
FIG. 2 shows an alternative embodiment with passive attenuation.

FIG. 2 shows an alternative embodiment with a passive network having differing AC and DC attenuations. The composite East-West waveform is coupled via resistor R91 to resistor R93 which is connected to the non-inverting input of the comparator U2. Resistor R93 is connected in parallel with a series connected capacitor C91 and resistor R92. Negative feedback from transistor Q1 is provided by resistor R90 which is coupled to the non-inverting input of comparator U2. Horizontal retrace pulses having zero DC component are coupled from winding W1 of horizontal output transformer T1 via a resistor R98. Resistor R98 and capacitor C94 are series coupled to form an integrator with capacitor C94 coupled to ground. The junction of resistor R98 and capacitor C94 is coupled the non-inverting input of comparator U2. Summation of the various signals is performed by resistor R90 and Capacitor C94 which are coupled to the non-inverting input of comparator U2. The shunting effects of resistor R98 have been ignored in the following analysis of the summing network. For the DC component of the East-West signal, the input signal amplitude to comparator U2 is determined by potentiometer formed by the series combination of resistors R91, R93 with resistor R90 effectively coupled to ground. This network attenuates the DC component by approximately 25%. The insertion loss of the network at DC is largely determined by resistor R93. The vertical rate parabola is subject to potential division by the series network of resistor R91, plus the parallel combination of resistors R93, R92 and capacitor C91 with resistor R90 and capacitor C94 effectively in parallel to ground. This network produces a minimal attenuation of the parabolic component of a few percent. The insertion loss of the network at vertical rate is set by resistor R2. Thus inventive network 200, with the values indicated in FIG. 2, changes the amplitude ratio of vertical parabola to DC component by about 25%, i.e. the DC component is attenuated by 25%. Thus the step size resulting from a single control bit change is reduced for the DC component.

Figure 3:
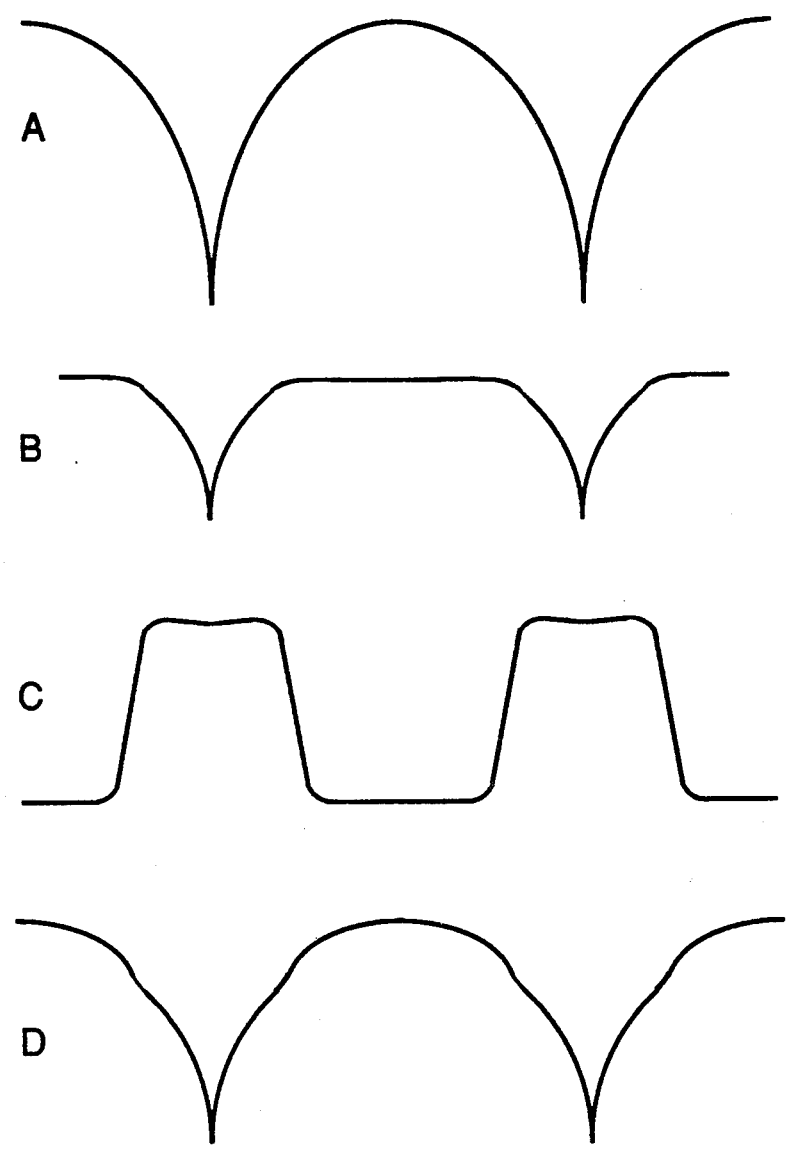
FIG. 3A shows the parabolic waveform at point A.
FIG. 3B shows the waveform at B, transistor Q250 base.
FIG. 3C shows the waveform at C, transistor Q250 collector.
FIG. 3D shows the dynamically attenuated waveform at the summing point D.

The introduction of new tube face geometeries, for example, flatter tubes, introduce pincushion distortion which is correctable with a modified parabolic signal. A modified parabola is produced by inventive active circuit 250 of FIG. 1. Circuit 250 dynamically varies the attenuation in the AC coupled path in response to the parabolic waveform. As described above, the East-West signal at the emitter of transistor Q200 is also coupled via series connected resistor R251 and capacitor C251 to the base of transistor Q250. The emitter of transistor Q250 is grounded and the collector electrode is coupled via resistor R252 to the base of transistor Q251. The base of transistor Q250 is also connected to the junction of resistor R253 and capacitor C252 which is connected to ground. Capacitor C252 provides a phase delay to compensate for phase shift in the series path of resistor R251 and capacitor C251. Resistor R253 is coupled to the junction of series connected resistor R252 and the anode of silicon diode D250. Resistor R252 is coupled to the reference +7.6 volt supply which forward biases diode D250 and supplies a current to ground. Resistor R253 couples the voltage across diode D250 to point B at the base of transistor Q250. The positive voltage at point B allows a positive center part of the parabolic signal, coupled via series connected resistor R251 and capacitor C251, to turn on transistor Q250 as depicted in FIG. 3B. The actual part of the parabola which turns on transistor Q250 is determined by resistors R251 and R253. When transistor Q250 turns on, base current is provided via resistor R252 to PNP transistor Q251, which turns on. FIG. 3C shows the waveform at the collector of transistor Q250. The value of resistor R252 is chosen to provide a smooth turn on of transistor Q251 thus avoiding sharp discontinuities in the modified parabolic waveform. When transistor Q251 turns on, resistor R254 is connected in parallel with resistor R202 and effectively eliminates the attenuation resulting therefrom. Thus, resistor R202 is effectively bypassed by resistor R254, with result that the amplitude of the parabolic component is dynamically increased during the center part of the parabola. FIG. 3D shows the parabolic waveform at summing point D. To illustrate the action of the semiconductor controlled switch, the center part of the waveform has been depicted with an amplitude greater than the 5% increase due to the dynamic attenuator action. The ratio of the parabolic waveform to that of the DC component is dynamically changed from 1.58:1, due to circuit 200, to 1.66:1 due to circuit 250. Thus inventive circuit 250 dynamically changes the shape of the parabolic waveform without affecting the DC, width determining, component of the East-West correction signal.

What is claimed is:

1. A deflection apparatus comprising:
   a deflection amplifier;
   a deflection waveform modulation circuit coupled to said deflection amplifier;
   a source for generating a parabolic modulation signal, wherein said signal comprises an AC component and a DC component, each having levels which define an amplitude ratio;
   a DC coupled path coupled between said source and said deflection waveform modulation circuit;
   an AC coupled path coupled between said source and said deflection waveform modulation circuit; and,
   an amplifier located in said AC coupled path and responsive to said modulation signal for altering said AC component of said modulation signal to provide an altered amplitude ratio, said altered amplitude ratio signal being coupled to said waveform modulation circuit for deflection waveform modulation.

2. The apparatus of claim 1, wherein said amplifier is controlled such that said amplitude ratio is varied responsive to a periodically varying control signal.

3. The apparatus of claim 2, wherein said control signal is coupled to a transistor switch for varying said amplitude ratio.

4. The apparatus of claim 3, wherein said control signal comprises said AC component coupled via a processing means.

5. The apparatus of claim 1, wherein said DC component determines a DC voltage condition at said waveform modulation circuit, said DC voltage condition being unchanged by said altered AC component.

6. The apparatus of claim 1, wherein said deflection waveform modulation circuit comprises a diode modulator.

7. A deflection apparatus comprising:
   a deflection amplifier;
   a deflection waveform modulation circuit being DC coupled to said deflection amplifier wherein a deflection waveform amplitude is controlled responsive to a modulation signal;
   a comparator having two inputs and an output, said inputs having a width determining DC potential established there between, a source for generating a first modulation signal, wherein said signal comprises an AC component and a DC component, each having levels which define an amplitude ratio;

means for altering said amplitude ratio coupled to said source for generating a first modulation signal, said altered amplitude ratio signal being coupled to one of said two inputs of said comparator, where said width determining DC potential is established by said DC component; and, a source of an integrated horizontal retrace pulse being AC coupled to one of said two inputs of said comparator as a second modulation signal in a manner that does not contribute to said width determining DC potential, said comparator output being coupled to said deflection waveform modulation circuit for deflection waveform amplitude control such that said deflection waveform amplitude is controlled by said DC component.

8. A deflection apparatus comprising:
a deflection amplifier;
a deflection waveform modulation circuit coupled to said deflection amplifier;
a source for generating a modulation signal, wherein said signal comprises an AC component and a DC component, each having levels which define an amplitude ratio; levels which define an amplitude ratio;
a DC coupled path coupled between said source and said deflection waveform modulation circuit;
an AC coupled path coupled between said source and said deflection waveform modulation circuit: and,
a gain controlled amplifier located in said AC coupled path, and being responsive to a periodically varying control signal for dynamically altering said amplitude ratio of said modulation signal to provide an altered amplitude ratio, said altered amplitude ratio signal being coupled to said waveform modulation circuit for deflection waveform modulation.

9. The apparatus of claim 8, wherein said gain controlled amplifier for dynamically altering said amplitude ratio comprises a semiconductor controlled attenuator.

10. The apparatus of claim 9, wherein said control signal is generated by a processing means coupled to said AC component.

11. The apparatus of claim 10, wherein said AC component comprises a parabolic signal.

12. The apparatus of claim 8, wherein said AC component of said modulation signal is dynamically altered to alter said amplitude ratio.

13. The apparatus of claim 12, wherein said AC component is dynamically increased in amplitude to alter said amplitude ratio.

* * * * *